United States Patent Office 2,936,166
Patented May 10, 1960

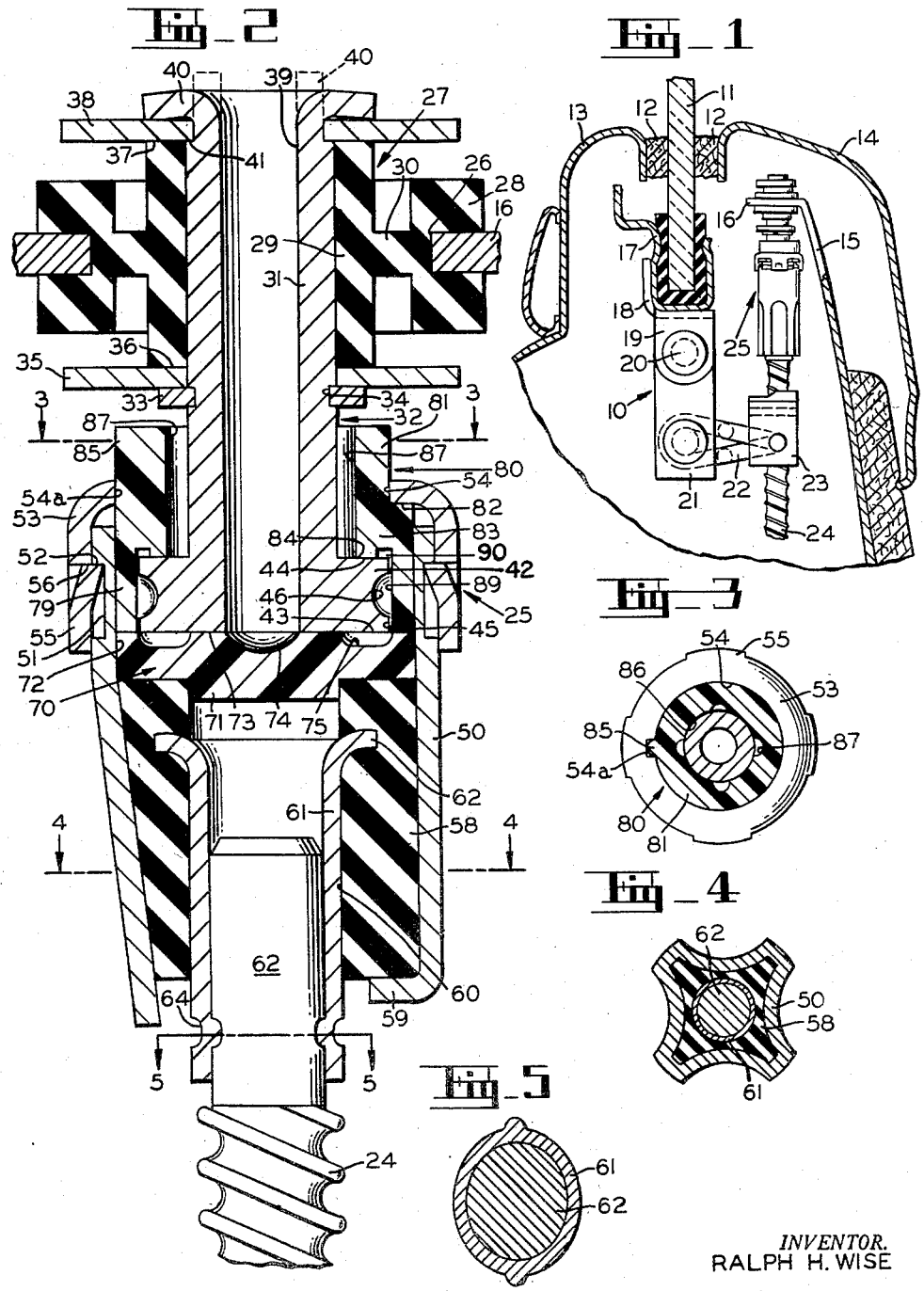

2,936,166

THRUST BEARING

Ralph H. Wise, Gary, Ind., assignor, by mesne assignments, to The Anderson Company, a corporation of Indiana Application April 25, 1955, Serial No. 503,719

11 Claims. (Cl. 268—133)

The present invention relates to a thrust bearing and more particularly to a thrust bearing having relatively movable thrust-transmitting surfaces, one of which is nonmetallic.

The present invention is a continuation-in-part of my prior applications now issued as Patent No. 2,714,004 and Patent No. 2,714,005.

In my above-identified earlier filed, copending applications, I have disclosed a window-lift mechanism particularly adapted for utilization in automotive vehicles. The present invention provides an improved thrust-bearing which, although adaptable for general utility, is particularly well suited for use in such window-lift mechanisms.

In general, the thrust bearing of the present invention provides a pair of thrust surfaces urged together under substantial load, one of the surfaces being nonmetallic in character. The nonmetallic surface is preferably composed of a resinous material, such as a polyamide resin, of which nylon is a preferred specific example.

Since the introduction of the polyamide resins, those skilled in the bearing art have realized that this material possesses improved bearing qualities, particularly when utilized in conjunction with metals. The polyamide resins are desirable for many bearing installations because of the ease with which they are molded or otherwise fabricated into rather complex bearing shapes, the highly desirable frictional characteristics of the material when used in conjunction with metal, and the slight degree of lubrication which is necessary for a property functioning bearing. However, heretofore the uses of nylon as a bearing material have been limited to low speed, low load applications. The practical limits at which nylon has been previously utilized as a bearing have been on the recommended order of 25 pounds per square inch of bearing area.

The present invention provides an improved bearing construction wherein nylon or similar nonmetallic materials may be utilized for a high speed, high load per unit area bearing surface. The primary reason for the previous limitations upon the utilization of nylon as a bearing surface resides in the fact that this material has the property of expansion upon heating. This expansion results in material flow of the nylon with portions of the material being physically "scrubbed" from the bearing surface under the relatively high temperatures which are involved in high load and/or high speed applications of the material. Once the surface begins to "scrub" under service conditions, the bearing will "freeze" and/or otherwise deteriorate rapidly, so that the bearing is no longer serviceable. I have discovered that nylon may be utilized as a high speed, high load-bearing surface if the bearing is so designed as to provide a chamber or area into which the nylon can flow, or into which the scrubbed particles of nylon may pass, to remove the flowing nylon portions from the bearing load area. This concept of providing room for the flow of resinous material under bearing operating conditions makes possible the design of a bearing wherein a resinous surface may be utilized to provide an effective high speed, high load-bearing of extremely simple design and which requires substantially no lubrication throughout the entire bearing life.

As has been heretofore explained, the present invention provides an improved bearing which is particularly well-adapted for utilization in a window lift, the bearing serving to resiliently support one end of a rotatable, preferably threaded, shaft which is rotated by power means and which provides the mechanism for longitudinally moving a window into and out of an opening, preferably an automobile ventilation opening. The specific bearing construction is disclosed in detail hereinafter, and serves generally to accommodate both axial and radial thrust loads which are imposed upon the rotatable shaft during operation of the window-lift mechanism.

It is, therefore, an important object of the present invention to provide an improved thrust bearing having a nonmetallic thrust-transmitting surface and operable under high speed and/or high load conditions.

Another important object of the present invention is the provision of an improved thrust bearing having a pair of thrust-transmitting surfaces operable under high speed and/or high load conditions, one of the thrust-transmitting surfaces being formed of a nonmetallic material having the property of expansion upon heating, the bearing providing portions immediately adjacent the one surface for accommodating the flow of the nonmetallic material under bearing operating conditions.

It is a further object of the present invention to provide an improved thrust-bearing for utilization in a window-lift mechanism for resiliently supporting one end of a rotatable threaded shaft.

Yet another important object is the provision of an improved thrust bearing having one surface formed of a polyamide resin which is flowable under bearing operating conditions, the surface communicating with non-bearing areas into which the resin can flow.

Yet another object of the present invention is the provision of an improved thrust bearing for a window-lift mechanism having a shaft supported by the bearing and subjected to radial and axial thrust loads, the bearing having metallic and nonmetallic cooperating thrust-transmitting surfaces with the nonmetallic thrust-transmitting surfaces being flowable under bearing operating conditions into nonbearing areas immediately adjacent to and in full communication with the bearing area.

Other and further important objects of the present invention will be apparent from the drawings appended hereto and the detailed description hereinafter.

On the drawings:

Figure 1 is a fragmentary sectional view, with parts shown in elevation, of a window lift embodying a thrust bearing of the present invention;

Figure 2 is a greatly enlarged axial sectional view of a thrust bearing of the present invention;

Figure 3 is a sectional view, on a reduced scale, taken along the plane 3—3 of Figure 2;

Figure 4 is a sectional view, on a reduced scale, taken along the plane 4—4 of Figure 2; and Figure 5 is a sectional view, on a reduced scale, taken along the plane 5—5 of Figure 2.

In Figure 1, reference numeral 10 refers generally to a window lift, such as that illustrated and described in detail in my two earlier filed copending applications hereinbefore referred to, and adapted for raising and lowering a window 11 guided between a pair of felt seals 12 or the like, which are retained by a sheet metal inner automobile door panel 13 and an outer door crown panel 14. The outer door panel 15 terminates in an inturned upper flange 16 generally beneath the crown panel 14. The window 11 has its lower marginal edge enclosed by a supporting channel 17 which carries an actuating bracket 18 secured thereto, and which has laterally spaced downturned ears 19 pivotally connected, as at 20, to a second bracket 21. The bracket 21 is connected through a fitting 22 to a nut unit 23, which is of the type specifically described in my above-identified Patent No. 2,714,005.

The nut unit 23 engages the threads of a generally vertically extending rotatable shaft 24 which is adapted to be driven, as by a motor (not shown). The shaft 24 may be driven by any desired power means, for example, by means of an electric motor and a flexible driving element as shown in my Patent No. 2,714,004.

During operation of the mechanism to elevate and lower the window 11, the screw 24 will be subjected to substantial axial and radial forces generated because of rotation of the screw and vertical or axial movement of the nut assembly 23 therealong. In addition to these forces, the screw 24 will be subject to other forces upon the exertion of downward pressure upon window 11, as upon attempted manual lowering of the window when it is partly raised. To accommodate these substantial loads upon the screw 24, the screw is preferably supported upon the flange 16 of the outer door panel 15 through, or by means of, a thrust bearing 25 of the present invention.

The bearing 25 is illustrated in Figure 2 of the drawing and serves generally to support the upper end of the threaded shaft 24 from the flange 16 of the panel. The flange 16 of the panel 15 is provided with a circular aperture 26 within which is mounted a resilient bushing, indicated generally at 27. The bushing 27 comprises an outer peripheral portion or collar 28 having a groove vertically midway of the outer peripheral edge thereof. The groove receives therein those portions of the flange 16 which surround the aperture 26 of the flange. The collar 28 of the bushing 27 is joined to a central, generally cylindrical collar 29 through a reduced thickness web 30, and the cylindrical inner collar 29 receives therethrough the vertically extending stem 31 of a thrust-transmitting element indicated generally at 32.

The collar 29 is secured to the stem 31 by means of a snap ring 33 positioned in a peripheral groove 34. Positioned upon the snap ring 33 is a circular thrust washer 35 against which the lower end 36 of the collar portion 29 of the bushing 27 is seated. The upper end 37 of the collar portion 29 of the bushing 27 is seated against the undersurface of a second identical thrust washer 38. It will be noted that the stem 31 is provided with a vertically extending axial bore 39 and the extreme upper end of the thrust-transmitting element 32 is staked or otherwise deformed radially outwardly to overlie the upper thrust washer 38.

Also, it will be noted that the upper, originally cylindrical end 40 of the element 31 provides, after deformation, a radially outwardly extending shoulder 41 against which the undersurface of the washer 38 is seated. The distance between the shoulder 41 and the upper surface of the washer 35 is less than the normal free length of the inner collar portion 29 of the bushing 27. The bearing 25 is assembled upon the flange 16 with the upper extremity 40 of the thrust-bearing element 31 in its dotted-line position, shown in Figure 2, i.e., before deformation of the portion 40 to its solid-line position of Figure 2. At this time, the normal height of the inner collar 29 is such that the washer 38 is positioned above the shoulder 41. Under these circumstances, the bushing groove will freely receive the flange 16 so that the bushing is positioned in the aperture 26. Next, the extreme upper end 40 of the thrust-transmitting element 32 is deformed radially from its solid-line position to compress the inner bushing collar 29 to the height shown in Figure 2. The bushing 27 is thus preloaded and the normal lateral expansion of the bushing, caused by foreshortening of the vertical dimensions of the collar 29, will prevent displacement of the bushing from the aperture 26.

The lower end of the thrust-transmitting element 32 is provided with a radially enlarged thrust-bearing shoulder 42 providing a lower thrust-bearing surface 43, an upper thrust-bearing surface 44, and a peripheral thrust-bearing surface 45. The peripheral thrust-bearing surface 45 is interrupted by a smoothly concave annular groove 46 for a purpose to be hereinafter more fully described.

Surrounding the thrust-transmitting shoulder 42 of the thrust-bearing element 32 is an open-topped, generally cylindrical transmitting housing or case 50, preferably formed of sheet metal. The housing is provided adjacent its upper end with an annular outer peripheral groove 51 providing an annular upper radial shoulder 52 which is adapted for securing a housing cap 53 to the housing 50. The cap 53 is generally circular in configuration having a central circular opening 54 and a plurality of vertically depending legs 55 provided with radially inwardly deformed tangs 56 enterable beneath the shoulders 52 of the casing 50 to retain the cap and the housing against vertical separation.

The housing 50 has positioned in the lower end thereof a normally cylindrical resilient block 58, formed of suitable elastomeric material, such as rubber, and retained therein against vertically downward displacement by flanges 59, formed integrally with the case 50 and deformed radially inwardly to underlie the block 58. Positioned within the center bore 60 of the block 58 is a generally cylindrical sheet metal connecting sleeve 61 having radially flared upper terminal portions 62 embedded in the elastomeric material forming the block 58 and firmly bonded to the elastomeric material against separation therefrom. This bonding may be by vulcanizing, cementing, or otherwise securing the members 58 and 61 together.

Positioned in the interior of the element 61 is a pintle end 62 of the threaded shaft 24. The pintle end 62 is axially aligned with the shaft 24 and may be formed integrally therewith, or may be rigidly secured thereto by suitable means, as by welding. The shaft end 62 and the connecting elements 61 are secured together by suitable means, preferably by staking indicated at 64. This staking is particularly illustrated in Figure 5 in which it will be seen that the normally cylindrical connection element 61 and the normally cylindrical pintle 62 of the shaft 24 are deformed into an oblate or elliptical form, as between a pair of dies, to prevent relative rotation and/or relative axial separation of the elements. To further secure the case 50 and the elastomeric block 58 against relative rotation, these elements are likewise staked, as indicated in Figure 4, with opposite sides of the case being radially inwardly deformed.

Positioned within the case 50 and snugly confined between the upper free edge of the elastomeric block 58 and the lower radial bearing surface 43 of the thrust-transmitting element 32 is positioned a thrust washer 70. The thrust washer 70 has a lower portion 71 of reduced radial diameter snugly inserted into the central opening of the cylindrical resilient block 58, a peripheral surface 72 snugly engaging the inner peripheral surface of the case 50, and an upper thrust-transmitting surface 73 adapted to abut the thrust-transmitting surface 43 of the thrust-transmitting element 32. The upper surface 73 of the washer 70 is provided with a concave central recess 74 of substantially the same diameter as, and registering with, the central bore 39 of the thrust-transmitting element 32. Also, the upper thrust-transmitting surface 73 of the washer 70 is provided with an annular groove 75 for a purpose to be hereinafter more fully described.

Interposed between the peripheral thrust-transmitting surface 45 of the element 32 and the case 50 is a flange 79 forming an integral part of an upper thrust-transmitting washer, indicated generally at 80. The upper thrust washer 80 comprises, in addition to the depending flange or skirt 79, an upper generally cylindrical portion 81 terminating in radially outwardly directed shoulders 82 joining the upper portion 81 to a medial portion 83 terminating in inwardly directed radial shoulders 84 at the inner periphery of the washer and in the depending skirt portions 79 at the outer periphery thereof. It will be noted in Figure 3 that the upper cylindrical portion 81 is snugly received by the aperture 54 of the cap 53. The generally circular aperture 54 is provided with an additional radial recess 54a which receives a radial tang 85 formed integrally with the portion 81 of the washer 80 to prevent rotation of the washer 80 within the cap 53. The radially outwardly directed shoulders 82 of the washer 80 snugly abut the inner surface of the cap 53 so that any upward thrust on the washer 80 is transmitted to the cap, while the radially inwardly directed shoulders 84 snugly abut the upper thrust surface 44 of the thrust-transmitting element 32. Radial thrust between the washer 80 and the element 32 is transmitted through the inner periphery of the skirt portion 79 and the peripheral surfaces 45 to the element 32. Axially upward thrust exerted by the threaded shaft 24 is transmitted through the lower washer 70 and the surface 43 of the element 32 to the flange 16 through the resilient bushing 27.

In final analysis, all the radial and thrust loads generated during operation of the window lift of Figure 1 are transmitted to the flange 16 through the resiliently distortable bushing 27.

The thrust washers 70 and 80 are preferably formed of a nonmetallic material. I have found that polyamide resins, for example nylon, may be utilized to good advantage as the material constituting these washers 70 and 80. The excellent coefficient of friction of such elements when utilized with the metallic thrust-transmitting element 32 and in conjunction with the casing 50 and the cap 53, together with the ease of forming the rather complex thrust-washer shapes by molding techniques, casting, or the like, makes the use of such material ideal under these circumstances. However, the use of such resinous materials does suffer one disadvantage, since such materials tend to flow when subjected to high load and high speed operating conditions. Heat generated during operation under such conditions causes further degradation of the material and additional material flow.

I have found that the utilization of such materials is practical when the thrust washers 70 and 80 are designed to accommodate this material flow. The specific construction to accommodate such flow is well-illustrated in Figures 2 and 3 of the drawings, in which it will be seen that the upper generally cylindrical portion 81 of the upper thrust washer 80 is provided with a plurality of axially extending grooves 87 to provide a nonbearing area immediately adjacent the bearing area formed by the inner periphery of the element 80 and into which the material can flow under operating conditions. The annular groove 46 formed in the element 32 serves a similar purpose by providing a nonbearing area immediately adjacent to, but removed from, the radial bearing surface 89 of the upper thrust washer 80. Similarly, the lower thrust washer 70 is provided with the annular groove 75 to accommodate material flow from the adjacent thrust surface 73.

Under actual operating conditions of high load per unit bearing area and at high rotational speeds, I have found that the polyamide resins, specifically nylon, flow under these conditions and tend to "freeze" on the shaft, inasmuch as the material flow tends to restrict the opening in which the shaft or shank portion of the element 32 operates, and this same material flow tends to "freeze" the surface 89 to the adjacent bearing surface 45 of the element 32, and similar "freezing" occurs between the surfaces 73 and 43. For example, operating for 50,000 substantially continuous cycles of movement of the nut element 23 (Figure 1), each cycle including a complete raising and lowering of the window 11, the recesses 87 were 75% filled with material which had flowed from the thrust peripheral surface 86 of the upper thrust washer 80. Similarly, the peripheral recess 46 and the annular recess 75 contained appreciable amounts of nylon which had flowed thereinto under the actual operating conditions. To accommodate flow between the bearing surfaces 44 and 84, I provide an additional recess 90 in the upper thrust washer 80. The desirable bearing characteristics of the illustrated device will be appreciated from the fact that the bearing was still in operable condition after the 50,000 cycles.

If desired, the annular recess 75 in the lower washer 70 and the central concave recess 74 and adjacent portions of the bore 39 of the element 32 may be filled with a suitable lubricant. Such a lubricant for use with nylon may comprise a colloidal solution of molybdenum disulphide in oil, or powdered graphite, or any other suitable lubricating material.

From the foregoing detailed description, it will be appreciated that the present invention provides a new and improved thrust bearing of general application, but which is particularly adapted for utilization in a window lift. One of the thrust-transmitting surfaces in the bearing is formed of a nonmetallic material, preferably a polyamide resin such as nylon, and the thrust-transmitting surfaces are disposed adjacent to nonbearing surfaces or areas into which the nonmetallic bearing element is allowed to flow under extreme operating conditions to maintain the bearing in proper running relation with the mating thrust-transmitting surfaces. The utilization of the nonbearing surfaces, or spaces, is necessary to prevent "freezing" or binding of the bearing under extreme operating loads and, for the first time, makes possible the utilization of a highly desirable bearing material under operating conditions which was previously thought unattainable with this material.

Other advantages of the specific bearing construction will be readily appreciated, inasmuch as it provides means for resiliently supporting a thrust-transmitting shaft upon a vehicle panel, or the like, the shaft being supported from the panel against both axial and radial thrust loads.

I claim:

1. In a window regulator for a window movable into and out of a vehicular body component and actuatable by a nut assembly carried by the window for travel along a rotatable threaded shaft, the improvement of means for resiliently supporting the shaft on the vehicular body component comprising a resiliently distortable bushing attachable to the component, a first thrust element carried by said shaft for rotation therewith, a second thrust element carried by the bushing, said elements having engageable thrust-transmitting peripheral and axial surfaces, one of said surfaces being nonmetallic and subject to material flow under operating conditions, and one of said thrust elements having its thrust-transmitting surface relieved to accommodate material flowing from the nonmetallic surface for preventing binding of the surfaces.

2. In a window regulator for a window movable into and out of a vehicular body component and actuatable by means carried by the window for travel along a rotatable threaded shaft, the improvement of means for resiliently supporting the shaft on the vehicular body component against both axial and radial thrust loads comprising a resiliently distortable bushing attachable to the component, a primary thrust element carried by said bushing and having an enlarged thrust portion, and a plurality of secondary thrust elements carried by said shaft for rotation therewith, said secondary elements having thrust-transmitting surfaces abutting the enlarged thrust portion of said primary element in both radial and axial relation thereto, said surfaces of said secondary elements being nonmetallic and subject to material flow under operating conditions, the nonmetallic thrust-transmitting surfaces being contiguous to relieved surface portions for accommodating material flowing therefrom and preventing binding of the surfaces.

3. A thrust bearing comprising a thrust element having an elongate shank and a radially enlarged head, a casing encompassing said head and an adjacent portion of said shank, means supporting said shank outside the confines of said casing, said casing and said element being relatively radially and axially movable, and a plurality of separable nylon thrust washers interposed between said casing and said thrust element in substantially surrounding relation to said element head and said adjacent shank portion to limit radial and axial movement between the casing and said element, said nylon washers having thrust surfaces engaging said element and provided with concave channels accommodating the entry thereinto of nylon flowing from said washers during operation of the bearing.

4. A thrust bearing comprising a metallic thrust element having peripheral and axial bearing surfaces, a nonmetallic thrust element having peripheral and axial bearing surfaces in bearing engagement with the surfaces of said metallic element, means respectively carrying said elements and adapted to subject the same to thrust loads transmitted from one element to the other through said bearing surfaces, said nonmetallic element surface being of a composition which has a tendency to flow under the thrust loads imposed thereon, and one of said elements having a portion of its peripheral surface spaced out of bearing engagement from the bearing surface of the other element to receive therein flow of the nonmetallic element.

5. A thrust bearing comprising first and second thrust-transmitting elements having relatively movable axial surfaces in extended thrust-bearing contact, said first thrust-transmitting element having its surface composed of a one piece nonmetallic material having a tendency to flow when in said thrust-bearing contact and the surface of one of said elements being formed with a recess free of thrust bearing contact immediately adjacent to and in communication with the nonmetallic surface to receive material flowing therefrom.

6. In a window regulator of the type having a rotatable screw for actuating a window into and out of an automotive body opening, a thrust bearing for supporting the screw comprised of a first thrust element having an elongate shank securable to the body and a radially enlarged head, a casing encompassing said head and an adjacent portion of said shank, said casing and said first element being relatively radially and axially movable, and a plurality of separable nylon thrust elements interposed between said casing and said first thrust element in substantially surrounding relation to said first element head and the adjacent shank portion to limit radial and axial movement between the casing and said first element, said nylon elements having thrust surfaces engaging said first element, said elements being provided with concave channels accommodating the entry thereinto of nylon flowing from said nylon elements during operation of the regulator.

7. A window regulator thrust bearing comprising a metallic thrust element having a peripheral and an axial bearing surface, a nylon thrust element having a peripheral and an axial bearing surface in extended bearing engagement with the respective surfaces of said metallic element, and means respectively carrying said elements and adapted to subject the same to thrust loads transmitted from one element to the other through said bearing surfaces, said nylon element surface having a tendency to flow under the heat generated by the thrust loads imposed thereon, said nylon element having a recess in its peripheral surface for accommodating the resultant flow of nylon.

8. A thrust bearing comprising first and second thrust-transmitting elements having relatively movable surfaces in extended thrust-bearing contact, said first thrust-transmitting element having its surface composed of a nonmetallic material subject to appreciable material flow under thrust-bearing conditions, one of said elements having a recess immediately adjacent to and in communication with the nonmetallic surface to accommodate material flowing therefrom, and passage means extending from the recess to the exterior of the thrust bearing to supply a lubricant therethrough and to said recess.

9. A thrust bearing for supporting one end of a rotatable shaft forming a part of a window regulator for an automotive vehicle comprising first and second thrust-transmitting elements having relatively movable surfaces in extended thrust-bearing contact, means resiliently securing one of said elements to the shaft, and means resiliently securing the other of said elements to the vehicle, said first thrust-transmitting element having its surface composed of a nonmetallic material subject to appreciable material flow under thrust-bearing conditions, said elements having nonthrust-transmitting portions defining a recess immediately adjacent to and in communication with the nonmetallic surface to accommodate material flowing therefrom.

10. In a window regulator for a window movable into and out of a vehicular body component and actuatable by a nut assembly carried by the window for travel along a rotatable threaded shaft, the improvement of a bearing for resiliently supporting the shaft for rotation comprising a resiliently distortable bushing attachable to the vehicular body component, a metalliferous thrust element carried by said bushing, a second element formed of a synthetic resinous composition, said elements having engageable thrust-transmitting peripheral and axial surfaces, said second element being subject to material flow under operating conditions, and one of said elements having its thrust-transmitting surfaces interrupted by a concave recess contiguous to said surfaces to accommodate material flowing from the second element for preventing binding of the surfaces.

11. A thrust device for an end of a rotary shaft comprising relatively rotatable elements, one element being metallic and the other element nonmetallic and having a surface portion contacting and reacting against a surface of the metallic element, said nonmetallic element being composed of a material conducive to flow upon relative movement between the contacting surfaces of said elements, one of said elements being formed with a relieved portion immediately adjacent to and in full communication with the relatively movable surface portion of said nonmetallic element to receive flow therefrom upon such relative movement.

References Cited in the file of this patent

UNITED STATES PATENTS

| | | |
|---|---|---|
| 2,337,867 | Brotman et al. | Dec. 28, 1943 |
| 2,590,325 | Kamp | Mar. 25, 1952 |
| 2,615,069 | Gallagher | Oct. 21, 1952 |
| 2,675,283 | Thompson | Apr. 13, 1954 |
| 2,731,261 | Drum | Jan. 17, 1956 |
| 2,796,305 | Grey | June 18, 1957 |

UNITED STATES PATENT OFFICE

CERTIFICATE OF CORRECTION

Patent No. 2,936,166                          May 10, 1960

Ralph H. Wise

It is hereby certified that error appears in the printed specification of the above numbered patent requiring correction and that the said Letters Patent should read as corrected below.

Column 1, line 43, for "property" read -- properly --; column 2, line 1, for "load-bearing" read -- load bearing --; column 4, line 9, for "thrust-bearing" read -- thrust-transmitting --; line 10, for "transmitting" read -- bearing --; column 7, line 36, for "one piece" read -- one-piece --.

Signed and sealed this 4th day of April 1961.

(SEAL)
Attest: ERNEST W. SWIDER

~~XXXXXXXXXX~~
Attesting Officer

ARTHUR W. CROCKER
                                                   Acting Commissioner of Patents